(12) United States Patent
Ikeda

(10) Patent No.: US 6,441,917 B1
(45) Date of Patent: *Aug. 27, 2002

(54) BUFFER MEMORY MANAGING METHOD AND PRINTING APPARATUS USING THE METHOD

(75) Inventor: Tetsuhito Ikeda, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/766,110

(22) Filed: Dec. 16, 1996

(30) Foreign Application Priority Data

Jan. 10, 1996 (JP) .............................. 8-001954

(51) Int. Cl.[7] .............................................. G06K 15/00
(52) U.S. Cl. ..................................... 358/1.16; 358/1.17
(58) Field of Search ................................. 395/115, 116, 395/114, 112, 113, 101, 500, 500.44–500.49; 358/404, 444, 407, 468, 1.16, 1.17, 1.15, 1.13, 1.14, 1.1

(56) References Cited

U.S. PATENT DOCUMENTS 5,108,207 A * 4/1992 Isobe et al. ................ 358/1.16
5,382,968 A * 1/1995 Endoh ........................ 395/114
5,745,663 A * 4/1998 Takagi ........................ 395/115

FOREIGN PATENT DOCUMENTS

EP 0241129 10/1987
WO WO9638778 12/1996

OTHER PUBLICATIONS

Child, "Specialty SRAM Combines Best of Dual–Port SRAMS and FIFOs", *Computer Design*, vol. 32, No. 6, pp. 34, 36, Jun. 1, 1993.

* cited by examiner

Primary Examiner—Gabriel Garcia
(74) Attorney, Agent, or Firm—Fitzpatrick, Cella, Harper & Scinto

(57) ABSTRACT

In a printing apparatus which performs printing operation in an emulation mode designated by a host computer, data necessary for the designated emulation mode is downloaded. First, a fixed data buffer size is reserved in accordance with the emulation mode which requires the maximum amount of data to be down-loaded. Then, a ring buffer for receiving data is assigned next to the fixed data buffer. After the data size to be down loaded is determined, portions of area reserved for the fixed data buffer which becomes unnecessary is reassigned as print data buffer. Since the print data buffer is a ring buffer, if no received data is stored at an address which is at the border between the fixed data buffer and the print data buffer, it is possible to move the border. Therefore, the printing apparatus waits until a state of the print data buffer changes to a state in which no received data is stored at the address at the border, then expands the print data ring buffer.

22 Claims, 9 Drawing Sheets

BUFFER MEMORY MANAGING METHOD AND PRINTING APPARATUS USING THE METHOD

BACKGROUND OF THE INVENTION

The present invention relates to a buffer memory managing method in, for example, a printing apparatus and, more particularly, to a method of managing a print buffer for storing data transmitted from a host computer, and the like, and a printing apparatus adapting the method.

A printing apparatus which can be controlled by a plurality of different printer control languages is known. In such a printing apparatus, an emulation mode corresponding to the printer control language to be used is informed by a host computer, and data necessary for the emulation is loaded down from the host computer. Thereafter, the printing apparatus receives print data written in the printer control language and performs a printing operation in accordance with the emulation mode by using the down-loaded data for the emulation. For example, there are cases where a plurality of application softwares correspond to respective printing apparatuses. In such cases, the printing apparatus actually connected to a host computer emulates other printing apparatuses used by respective applications. Therefore, the data which is necessary for the emulation has to be loaded down to the actually connected printing apparatus. In order to register the data which is necessary for the emulation, e.g., symbols and special fonts, in the printing apparatus from an application software, a memory area, called fixed data buffer, is reserved in the printing apparatus. The size of the fixed data buffer depends upon emulation modes.

Such a printing apparatus which emulates two or more printing apparatuses and automatically switches emulation modes for the emulations must reserve the maximum fixed data buffer size required by the emulation modes in a memory of the printing apparatus when the apparatus is powered on.

However, when the fixed data buffer size is set to the maximum size required by the emulation modes, more than necessary memory area may be reserved as the fixed data buffer in an emulation mode which does not require a large fixed data buffer size, which greatly wastes a memory area.

Further, the larger the size of a print data buffer provided in a printing apparatus for receiving data transmitted from a host computer, the larger the amount of data which can be transmitted in one operation from a host computer. Accordingly, a large print data buffer in the printing apparatus is preferred since a host computer can be released early. However, a large print data buffer requires increase in the capacity of memory, which is a disadvantage in terms of cost.

SUMMARY OF THE INVENTION

The present invention has been made in consideration of the above situation, and has as its object to eliminate a wasted area in a limited memory area in a printing apparatus and effectively use the memory by reassigning the wasted area as a print data buffer, thereby providing a buffer managing method capable of increasing the print data buffer size in the memory of the printing apparatus without increasing a manufacturing cost and providing a printing apparatus adapting the method.

The foregoing object is attained by providing a buffer managing method for managing a data storage area, assigned in a memory of a predetermined size, and a ring buffer which is sequentially addressable to the data storage area, the method comprising: a calculation step of calculating a size which can be reduced from the data storage area; a determination step of determining no received data is stored at the end of the ring buffer; and an expansion step of expanding the ring buffer by the size which is calculated at the calculation step by moving a border between the ring buffer and the data storage area if it is determined at the determination step that no received data is stored at the end of the ring buffer.

Further, the foregoing object is also attained by providing a printing apparatus capable of executing an emulation mode designated by a host device out of a plurality of emulation modes, the apparatus comprising: a memory having a predetermined size of storage area; assigning means for assigning an area of the memory corresponding to a maximum fixed data buffer size required by the plurality of emulation modes as a fixed data buffer, and assigning the rest of an area of the memory as a ring buffer which stores data received from the host device; receiving means which receives data from the host device; determination means for determining an emulation mode in accordance with data received by the receiving means; calculation means for calculating a difference between the fixed data buffer size which is required by the determined emulation mode and the maximum fixed data buffer size assigned by the assigning means; judging means for judging whether or not no received data is stored at the end of the ring buffer; and an expansion means for expanding the ring buffer by the size calculated by the calculation means by moving a border between the ring buffer and the fixed data buffer if it is determined that no received data is stored at the end of the ring buffer by the judging means.

Furthermore, the foregoing object is also attained by providing a computer program produce comprising a computer usable medium having computer readable program code means embodied in the medium for managing a data storage area, assigned in a memory of a predetermined size, and a ring buffer which is sequentially addressable to the data storage area, the product including: first computer readable program code means for calculating a size which can be reduced from the data storage area; second computer readable program code means for determining no received data is stored at the end of the ring buffer; and third computer readable program code means for expanding the ring buffer by the size which is calculated at the calculation step by moving a border between the ring buffer and the data storage area if it is determined at the determination step that no received data is stored at the end of the ring buffer.

With the aforesaid configurations, when a plurality of different emulation modes are switched automatically, the fixed data buffer size necessary in each emulation mode can be individually set, thereby effectively utilizing a memory area. Further, since the remaining memory area is used as a print data buffer, it is possible to increase the print data buffer size without increasing the capacity of the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1A:
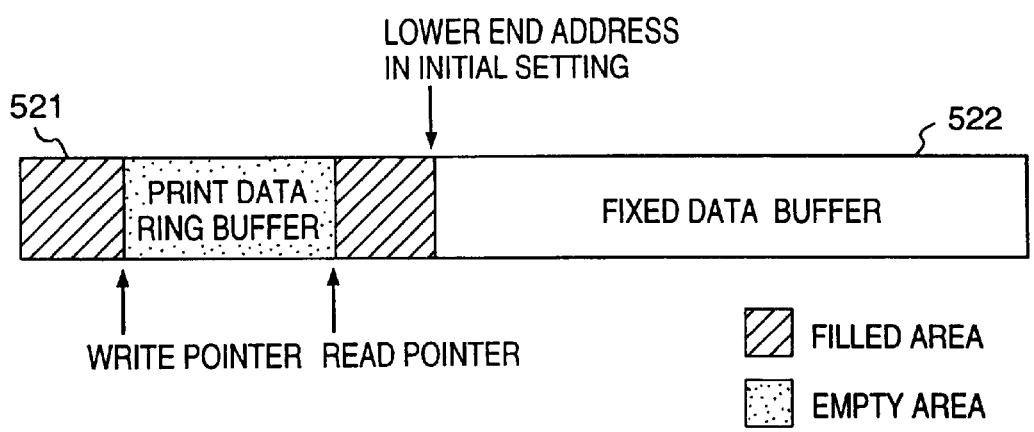
FIGS. 1A to 1C are drawings for explaining a buffer size management according to a first embodiment of the present invention.
Figure 1B:
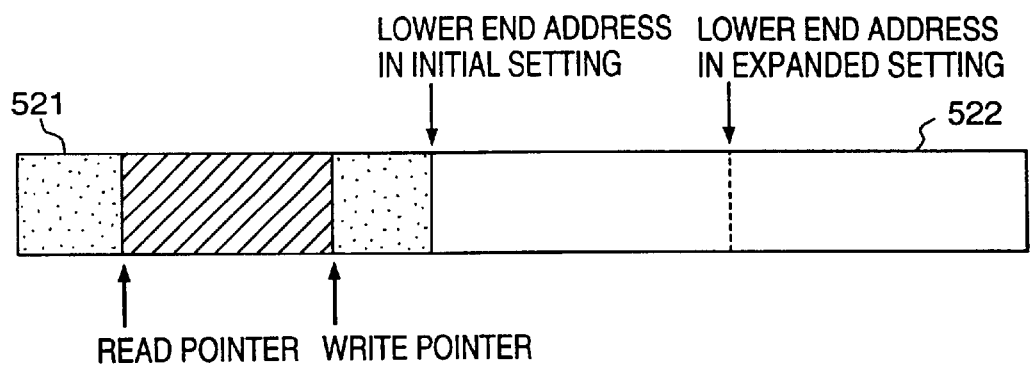
Figure 1C:
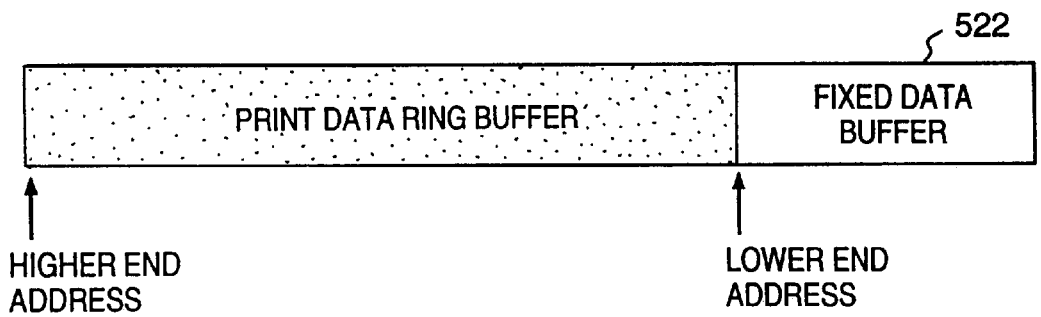
Figure 2:
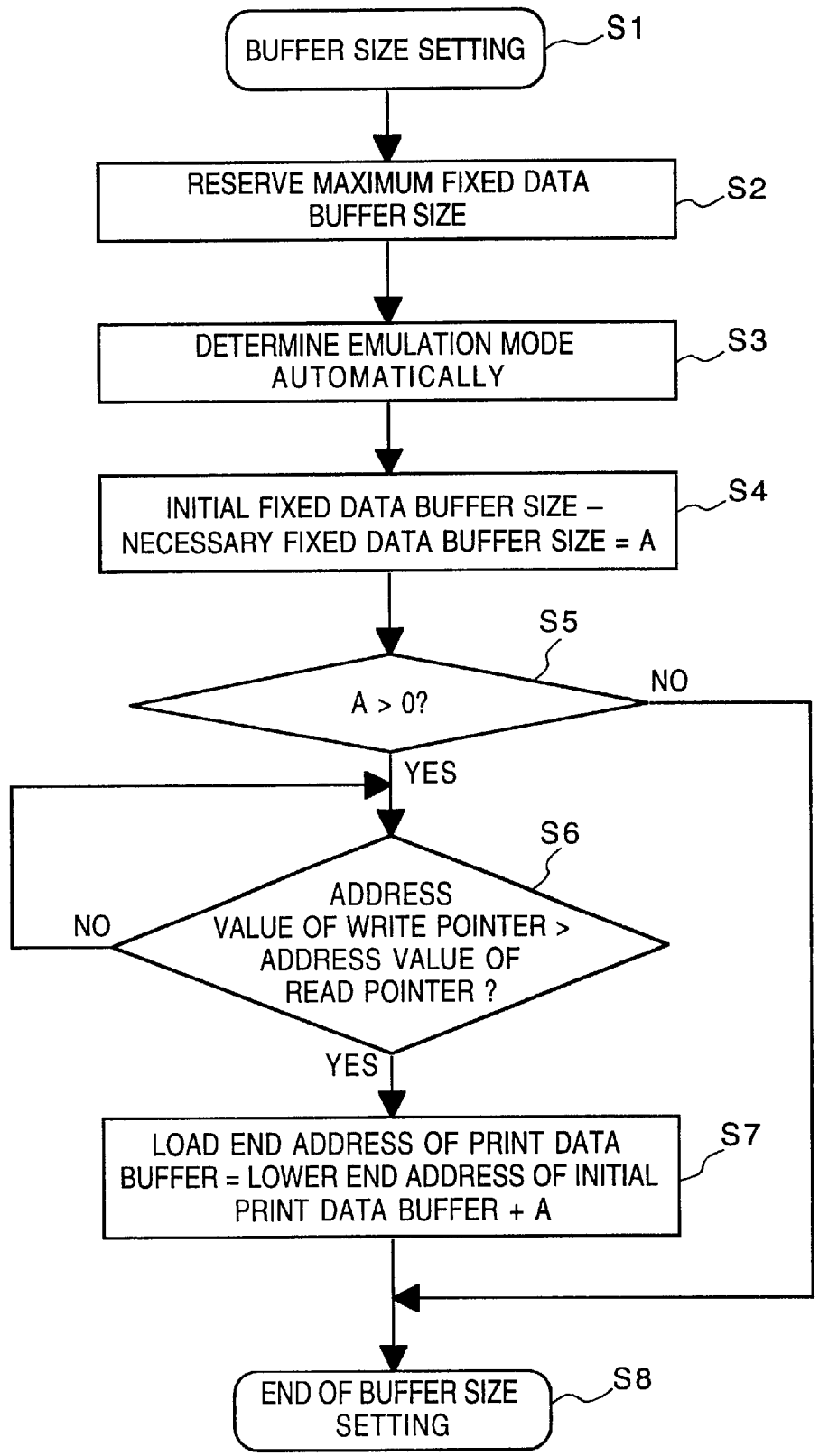
FIG. 2 is a flowchart illustrating a sequence for changing the buffer sizes according to the first embodiment of the present invention.
Figure 5:
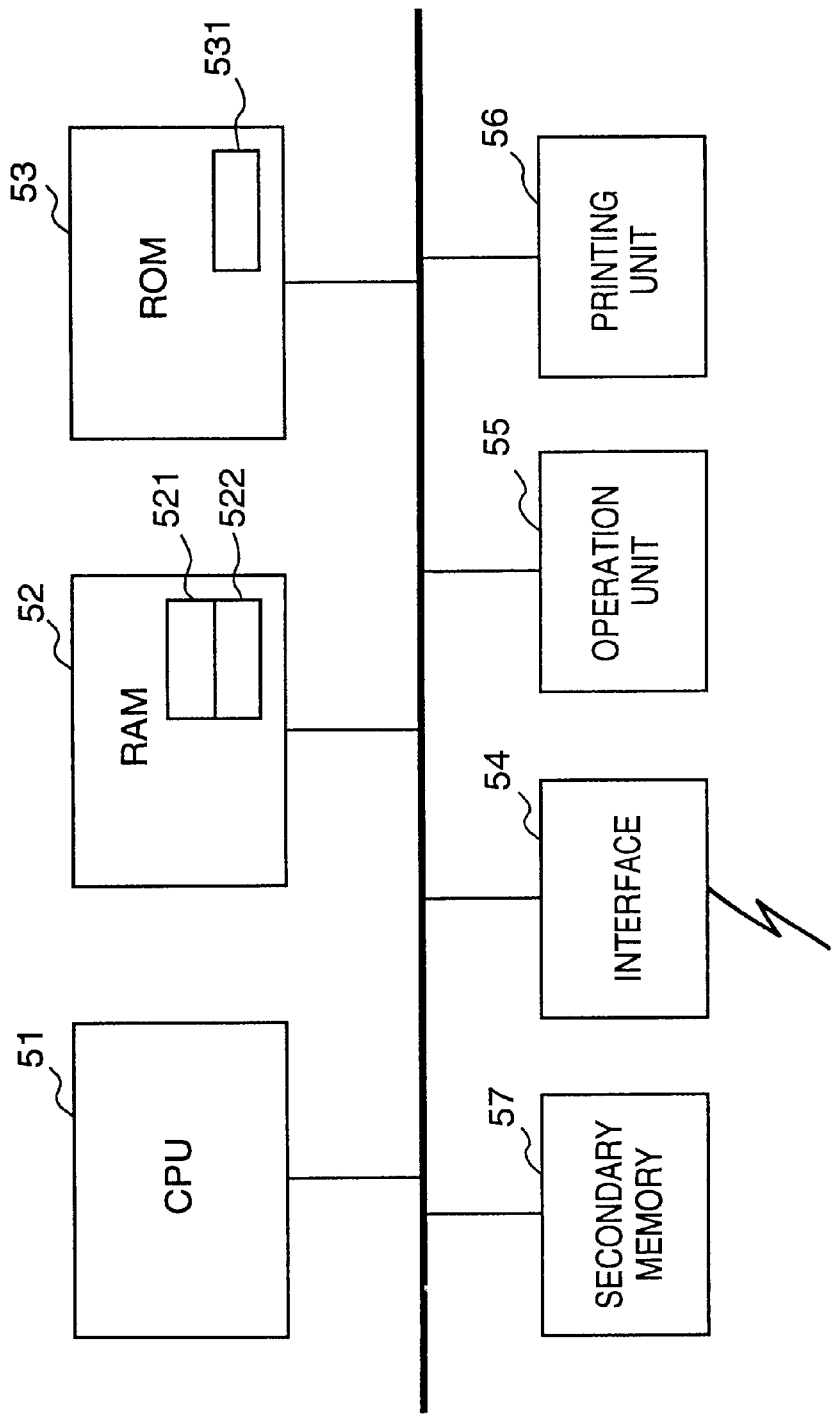
FIG. 5 is a block diagram illustrating a printing apparatus according to the embodiments.
Figure 6:
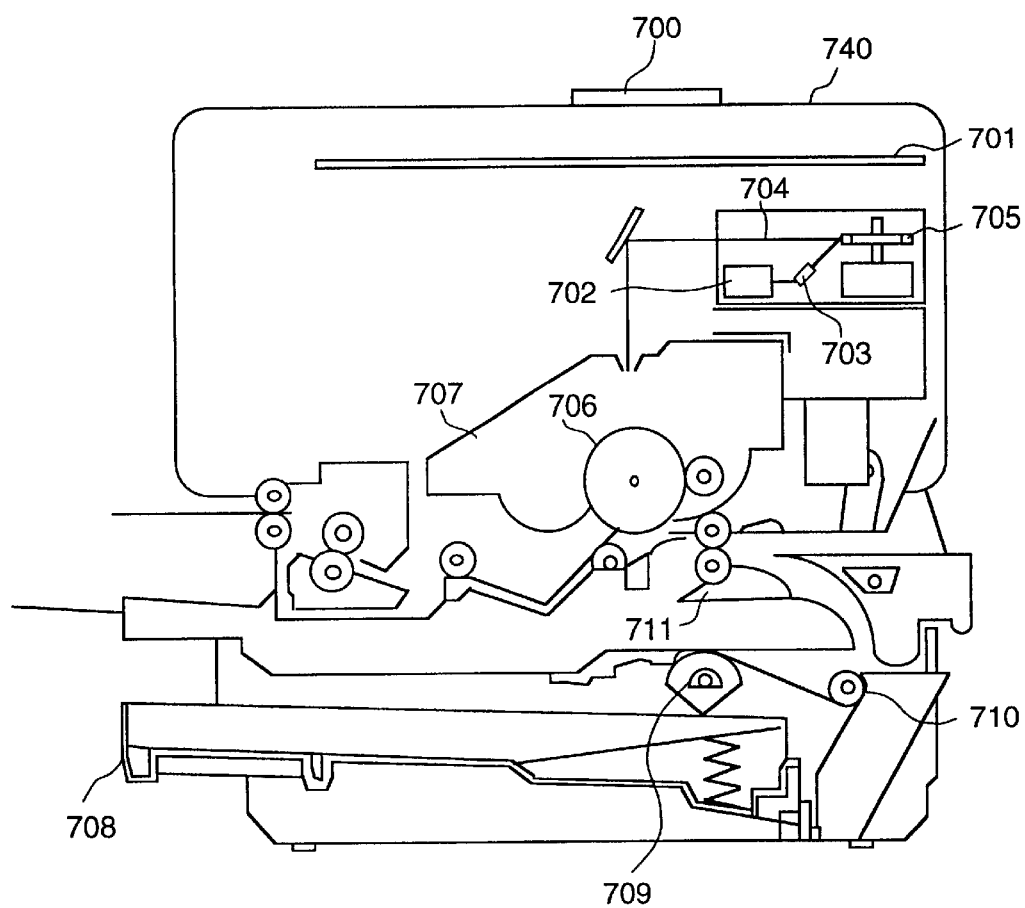
FIG. 6 is a cross sectional view of a printer adapting laser beam method.
Figure 7:
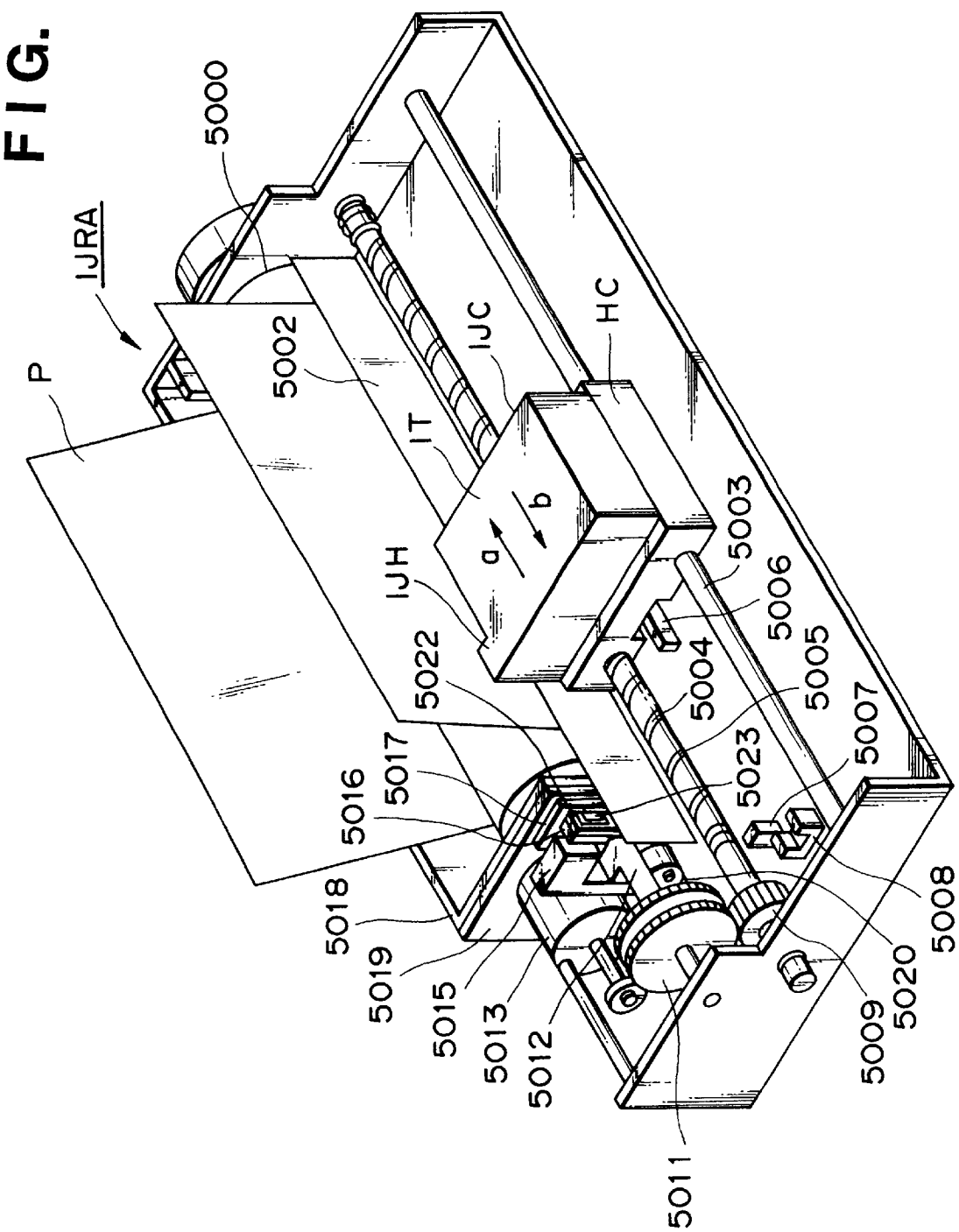
FIG. 7 is an oblique view showing a printer adapting ink-jet method.

A configuration of printers according to a first embodiment of the present invention are shown in FIGS. 5 to 7, and a sequence of buffer managing adapted by the printers is shown in FIGS. 1 and 2.

<Configuration of the Printer>

FIG. 5 is a block diagram illustrating a configuration of a printer. Referring to FIG. 5, a CPU 51 controls the entire apparatus by executing a program stored in a ROM 53 or a RAM 52, and performs a printing operation. In the RAM 52, a print data buffer 521 and a fixed data buffer 522 are reserved in addition to an area for programs. Further, in the ROM 53, a program 531, font data, and so on, are stored. An interface 54 is connected to a host computer, and the printer receives data through the interface 54 as well as transmits a state of the printer to the host computer. An operation unit 55 includes a display panel for displaying the state of the printer to an operator and a keyboard, or the like, for the operator to input instructions. A printing unit 56 prints data developed as an image on a printing medium, such as a paper sheet.

FIG. 6 is a cross sectional view of a printer when the printing unit 56 adapts laser beam method.

In FIG. 6, reference numeral 740 denotes a main body of a laser beam printer (LBP), which forms an image on a recording paper sheet as a recording medium on the basis of provided character patterns, and the like. Reference numeral 700 denotes an operation panel on which switches for operation and a liquid crystal display (LCD) are provided; and 701, a printer control unit for controlling the entire operation of the LBP 740 and analyzing character pattern information. The printer control unit 701 primarily performs conversion from character pattern information into video signals, then outputs the video signals to a laser driver 702. The laser driver 702 is a circuit for driving a semi-conductor laser 703, and turns on and off the laser beam 704 emitted from the semi-conductor laser 703 on the basis of the input video signal. The laser beam 704 is reflected by a rotational polygon mirror 705 so as to scan an electrostatic drum 706 in the right-and-left direction. Accordingly, a latent image of character patterns is formed on the electrostatic drum 706. The latent image is developed by a developing unit 707 which is placed around the electrostatic drum 706, thereafter transferred to recording paper. Here, a cut sheet is used. The recording paper sheet is set in a paper feed tray 708 which is set to the LBP 740, and fed into the printer by a paper-feed roller 709 and a conveying rollers 710 and 711, then provided to the electrostatic drum 706.

FIG. 7 is an oblique view of the printing unit 56 when ink-jet method is adapted. Referring to FIG. 7, a carriage HC engages with a spiral groove 5004 of a lead screw 5005, which rotates via driving force transmission gears 5009 to 5011 upon forward/reverse rotation of a driving motor 5013. The carriage HC has a pin (not shown), and is reciprocally scanned in the directions of arrows a and b in FIG. 7. An ink-jet cartridge IJC is mounted on the carriage HC. Reference numeral 5002 denotes a sheet pressing plate, which presses a paper sheet against a platen 5000, ranging from one end to the other end of the scanning path of the carriage. Reference numerals 5007 and 5008 denote photocouplers which serve as a home position detector for recognizing the presence of a lever 5006 of the carriage in a corresponding region, and used for switching, e.g., the rotating direction of the motor 5013. Reference numeral 5016 denotes a member for supporting a cap member 5022, which caps the front surface of the printing head IJH; and 5015, a suction device for sucking ink residue through the interior of the cap member. The suction device 5015 performs suction recovery of the printing head via an opening 5023 of the cap member 5015. Reference numeral 5017 denotes a cleaning blade; 5019, a member which allows the blade to be movable in the back-and-forth direction of the blade. These members are supported on a main unit support plate 5018. The shape of the blade is not limited to this, but a known cleaning blade can be used in this embodiment. Reference numeral 5021 denotes a lever for initiating a suction operation in the suction recovery operation. The lever 5021 moves upon movement of a cam 5020, which engages with the carriage, and receives a driving force from the driving motor via a known transmission mechanism such as clutch switching.

The capping, cleaning, and suction recovery operations are performed at their corresponding positions upon operation of the lead screw 5005 when the carriage reaches the home-position side region. However, the present invention is not limited to this arrangement as long as desired operations are performed at known timings.

<Buffer Management>

In the RAM 52 of the printer as described above, a consecutive memory area is reserved for the fixed data buffer 522 and the print data buffer 521. FIG. 2 is a flowchart showing a processing sequence for reserving areas for the fixed data buffer and the print data buffer and the processing sequence starts at the time when the printer is turned on. This processing sequence is realized by executing a predetermined program by the CPU 51. It should be noted that, in the following explanation, the print data buffer is read and write in the ascending order of the address.

When the processing sequence shown in FIG. 2 starts right after the printer is turned on (step S1), a fixed data buffer having the maximum size required by any of a plurality of emulation modes is assigned from reserved memory area. The remaining memory area is assigned as a print data buffer in the form of a ring buffer (step S2). The fixed data buffer is assigned the higher memory addresses and the print data buffer the lower memory addresses. Note, data received from a host computer is stored in the print data buffer at addresses designated by a write pointer in an ascending order. Further, the data written in the print data buffer is read out in the write order in accordance with a read pointer. The sequences of write and read operations are respectively shown in FIGS. 8 and 9. Therefore, the read pointer and the write pointer designates an address between the high end address (minimum address) and the low end address (maximum address) of the ring buffer formed by connecting the high end address and the low end address of an area assigned as the print data buffer. FIG. 1A shows the print data buffer (ring buffer for reception) and the fixed data buffer which are set as above.

The host computer designates the emulation mode to be used in the printer, and, when an emulation mode is determined in accordance with an application, it notifies the designated mode to the printer.

The printing device automatically determines the emulation in accordance with the transmitted data from the host computer, and determines the emulation mode (step S3).

After the emulation mode is determined, when the fixed data buffer size required by the determined emulation mode is smaller than the fixed data buffer size initially set at step S2 just after the printer is turned on, the excess fixed data buffer area is reassigned as the print data buffer area. In this case, data which is already written in the print data buffer must be read out in the write order in accordance with the read pointer. At this point, the relationship between the read pointer and the write pointer of the print data buffer addresses is either the state shown in FIG. 1A or the state shown in FIG. 1B. Accordingly, there is a possibility that the read-out operation may not be performed correctly. In the state shown in FIG. 1B, i.e., in a case where received data is not stored in an end portion of the print data buffer, since the low end address of the print data buffer is not used, the print data buffer can be expanded by increasing the low end address of the print data buffer. In this case, the write pointer is incremented until it hits the new low end address expanded by changing the setting of the print data buffer so that data is written until the low end address. Further, after the read pointer designates the addresses at which data has already written before the print data buffer is expanded, it proceeds to data addresses in the expanded area toward the low end address of the expanded print data buffer. Accordingly, the received data can be read out correctly in the received order.

In contrast, in a state in which received data is stored in the end of the print data buffer, as shown in FIG. 1A, i.e., in a state where data is written in the low end address of the print data buffer, there is no problem to the write pointer to increase the low end address of the print data buffer, since the write pointer points to store received data at an address which succeeds to the largest address where data has already been stored and moves toward the new low end address of the expanded print data buffer. However, in this case, the read pointer also moves toward the new low end address of the expanded print data buffer. As a result, data is read from an expanded area where no data has been written. Accordingly, reassignment of the print data buffer and the fixed data buffer has to be performed during in the state shown in FIG. 1B.

Accordingly, the initial fixed data buffer size is compared to the fixed data buffer size determined after the emulation mode determination (steps S4 and S5), then, if the fixed data buffer size can be reduced, the address value of the write pointer and the address value of the read pointer of the print data buffer are compared prior to expanding the fixed data buffer size (step S6). If the address value of the read pointer is smaller than the address value of the write pointer, since the relationship between the read pointer and the write pointer is in the state shown in FIG. 1B, the low end address of the print data buffer is increased by the amount A which is equal to the fixed data buffer area which became unnecessary (step S7). Whereas, if the address value of the read pointer is not smaller than the address value of the write pointer, i.e., when in the state shown in FIG. 1A, the process waits while the writing and reading operation of the data proceeds until the address value of the read pointer becomes smaller than the address value of the write pointer, then the low end address of the print data buffer is increased. Accordingly, received data can be correctly read out.

At step S6 in FIG. 2, when the relationship between the write pointer and the read pointer is in the state shown in FIG. 1A, the process waits until the values of the write pointer and the read pointer becomes the state shown in FIG. 1B.

Figure 8:
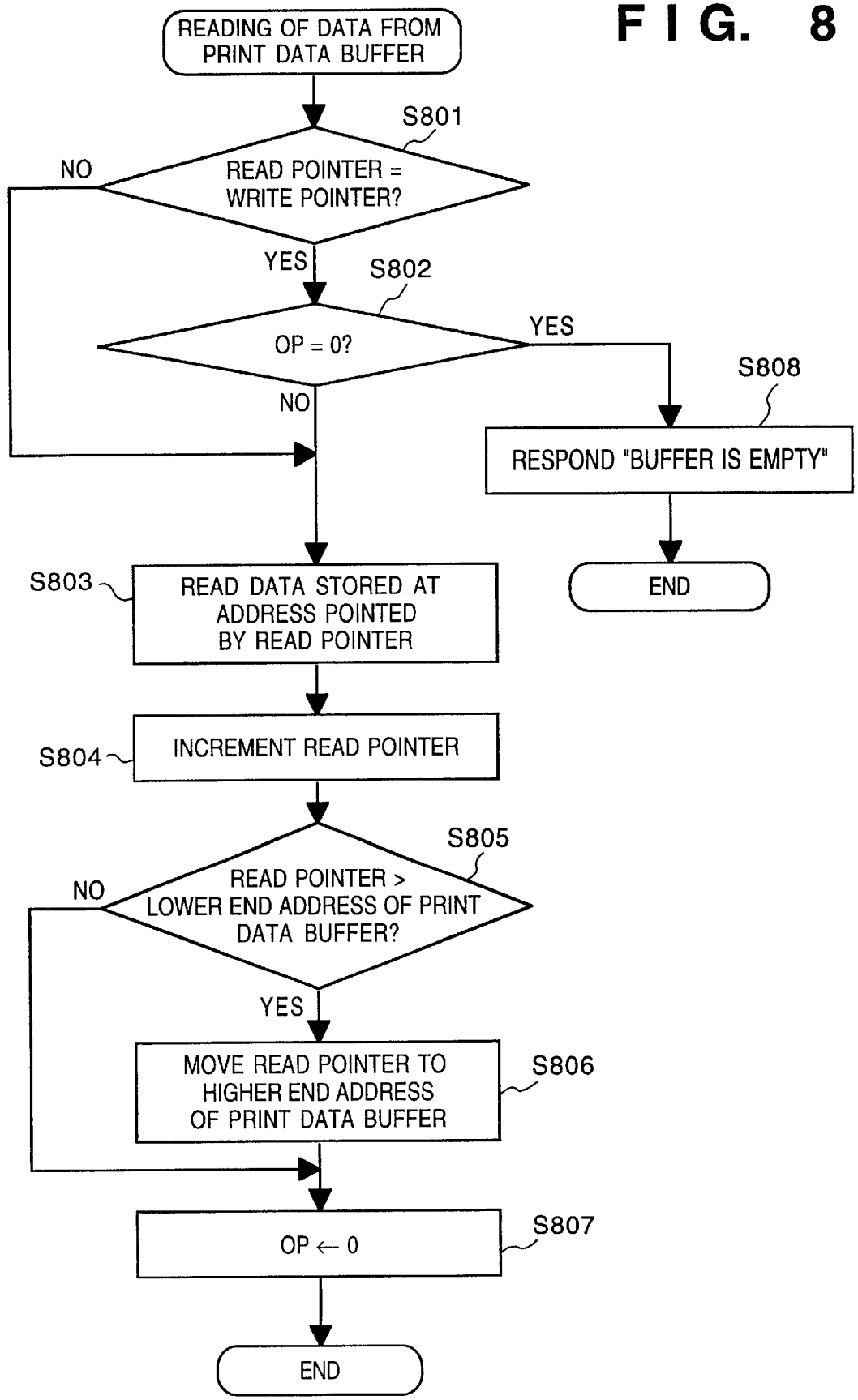
FIG. 8 is a flowchart of a processing sequence for reading data from a print data buffer.
Figure 9:
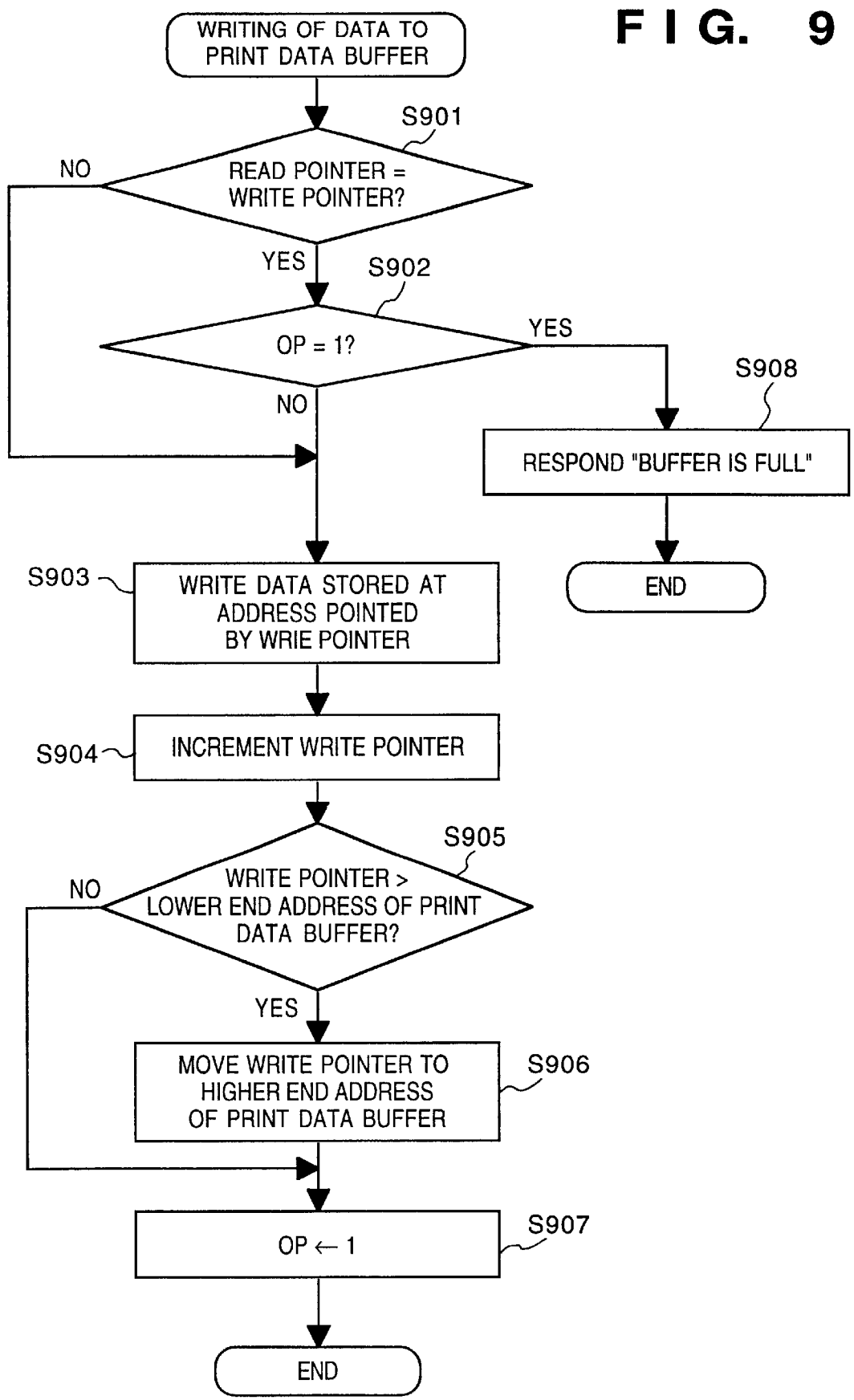
FIG. 9 is a flowchart of a processing sequence for writing data to a print data buffer.

Meanwhile, the values of the read pointer or the write pointer are updated as data is read or written from/to the print data buffer in the sequences shown in FIGS. 8 and 9 in order to realize a ring buffer.

FIG. 8 shows an operational sequence for reading data from the print data buffer. First, the values of the read pointer and the write pointer are compared (step S801), and if they are the same, then the value of flag op, which indicates that the last operation performed is writing of data, is checked (step S802). If the value of the read pointer and the value of the write pointer is equal, then the print data buffer is either full or empty. In this case, if writing of data is performed most recently, then it means that the print data buffer is full, while if reading of data is performed most recently, then it means that the print data buffer is empty. Therefore, the flag op which indicates that the last operation performed is writing of data is tested, and if it is 0, then it is determined that the print data buffer is empty, and the determination result is transmitted to a caller of the reading procedure shown in FIG. 8.

If the buffer is not empty, then data stored at an address where the read pointer is pointing is read (step S803), and the read pointer proceeds to the next address (step S804). Next, whether the value of the proceeded read pointer is over the low end address of the print data buffer or not is determined (step S805), and if it the read pointer is returned to the top of the print data buffer (step S806). It should be noted that, in a case where the processes shown in FIG. 2 is performed in parallel to the processes shown in FIG. 8, with the completion of the process at step S806, the state of the ring buffer changes from the state shown in FIG. 1A to the state shown in FIG. 1B. Accordingly, with the completion of the process at step S806, the condition tested at step S6 in FIG. 2 is satisfied, and the low end address of the print data buffer is increased. Lastly, the flag op indicating that writing of data is performed is set to 0, and the process is completed.

FIG. 9 shows an operational sequence for writing data to the print data buffer. First, the values of the read pointer and the write pointer are compared (step S901), and if they are the same, then the value of flag op is checked (step S902). If the value of the read pointer and the value of the write pointer is equal, then the print data buffer is either full or empty. In this case, if writing of data is performed most recently, then it means that the print data buffer is full, while if reading of data is performed most recently, then it means that the print data buffer is empty. Therefore, the flag op which indicates that the last operation performed is writing of data is tested, and if it is 1, then it is determined that the print data buffer is full, and the determination result is transmitted to a caller of the writing procedure shown in FIG. 9.

If the buffer is not full, then data is written at the address where the write pointer is pointing (step S903), and the write pointer proceeds to the next address (step S904). Next, whether the value of the proceeded write pointer is over the low end address of the print data buffer or not is determined (step S905), and if it is, the write pointer is returned to the top of the print data buffer (step S906). Lastly, the flag op indicating that writing of data is performed is set to 1, and the process is completed.

As described above, the pointers are controlled so that after the low end address the pointer returns to the high end address, thereby realizing a ring buffer.

It should be noted that to expand the print data buffer is to increase the low end address of the ring buffer. More specifically, as shown in FIGS. 8 and 9, since the pointers are incremented as writing and reading data to/from the print data buffer, whether the addresses of the pointers after they are incremented exceed the low end address or not is determined, and if it is, the pointers are moved back to the high end address of the print data buffer. The low end address is changed at step S7. As a result, the memory has the memory areas as shown in FIG. 1C.

By performing the aforesaid operation, it is ossible to correctly read out received data which has een stored. Further, by reassigning a conventionally asted memory area as a print data buffer area, it is possible to expand the print data buffer size without increasing the memory size provided in a conventional printing apparatus.

Second Embodiment

Figure 3A:
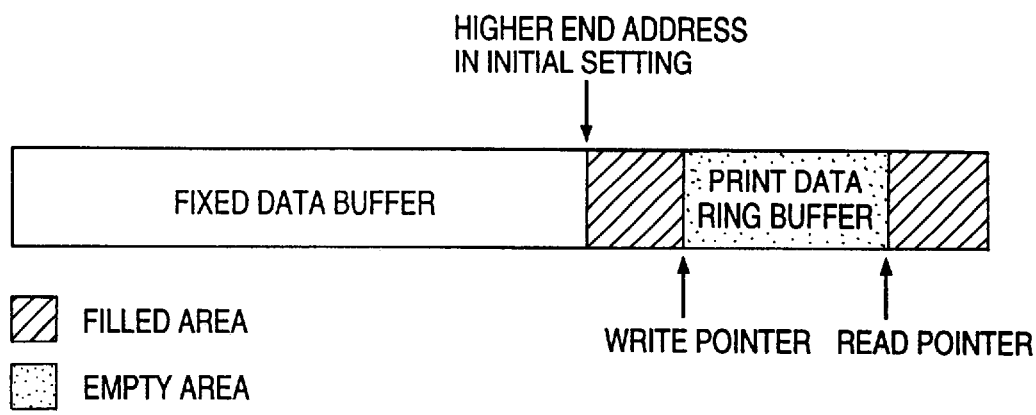
FIGS. 3A to 3C are drawings for explaining a buffer size management according to a second embodiment of the present invention.
Figure 3B:
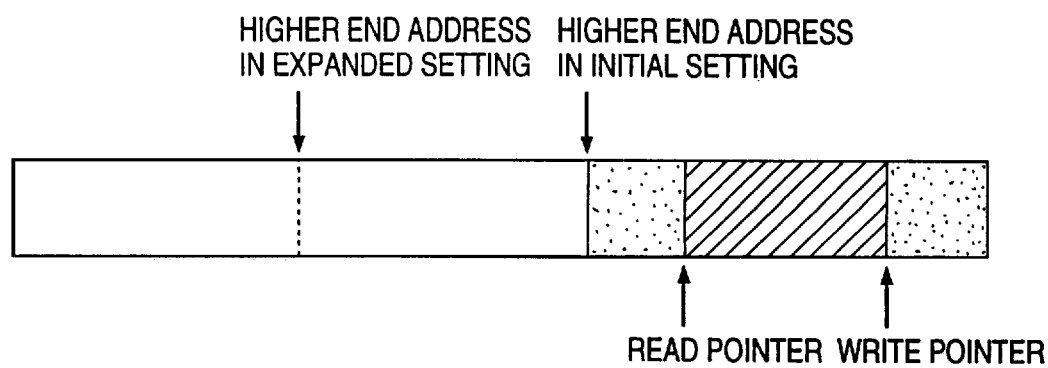
Figure 3C:
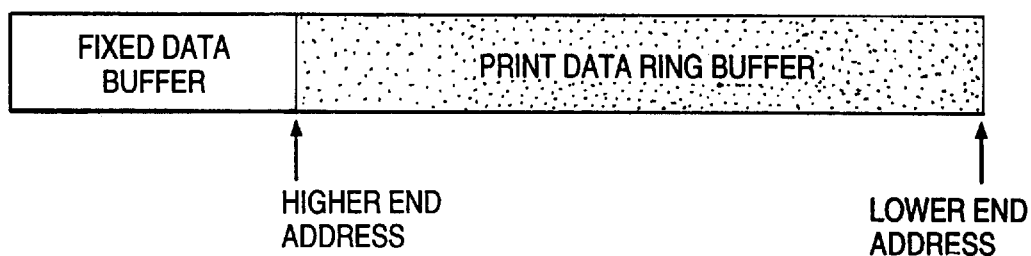
Figure 4:
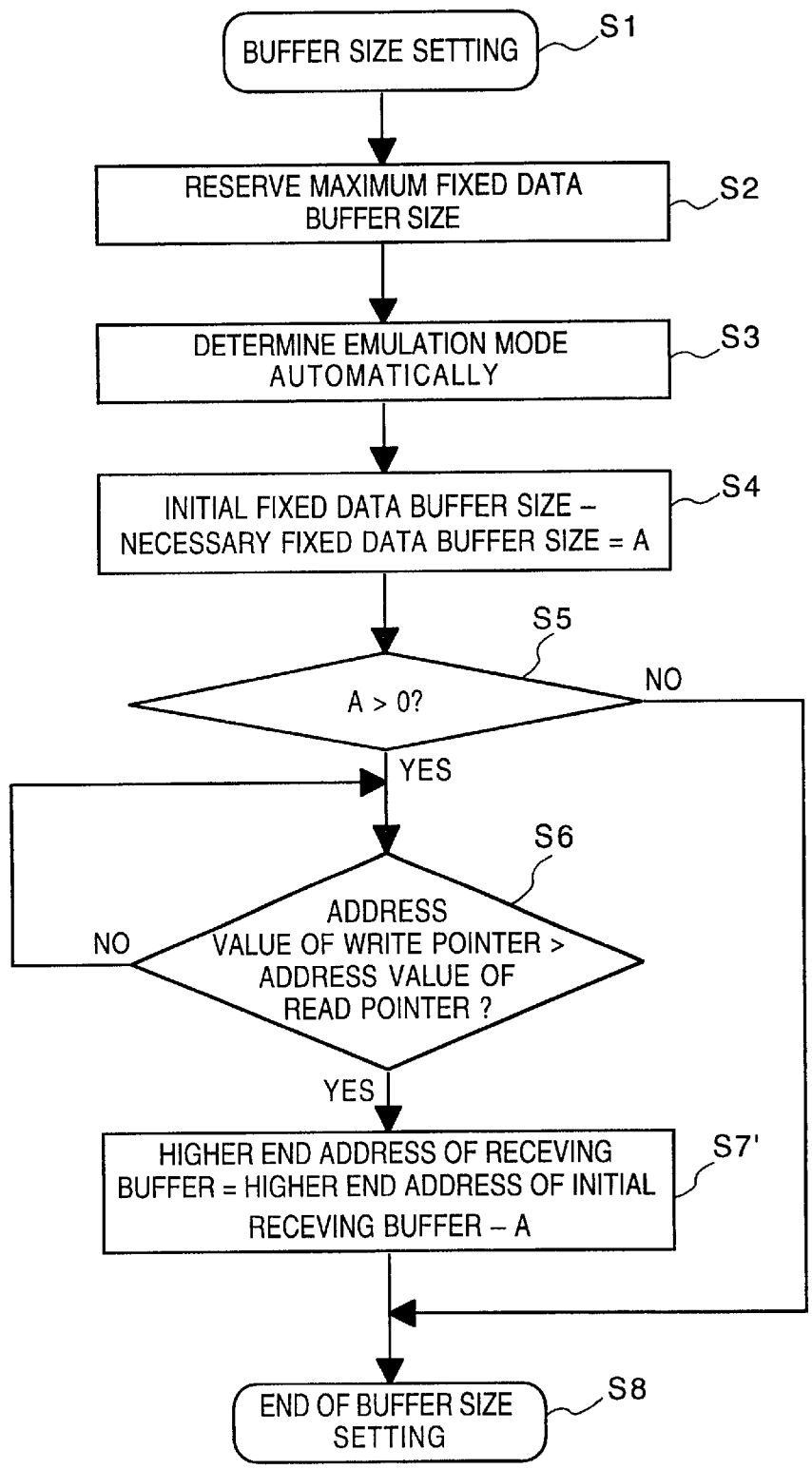
FIG. 4 is a flowchart illustrating a sequence for changing the buffer sizes according to the second embodiment of the present invention.

FIGS. 3 and 4 are an explanatory view and a flowchart of another buffer management sequence of a printer shown in FIGS. 5 to 7.

In the first embodiment, the fixed data buffer is assigned the higher memory addresses of a memory area saved in advance. In the second embodiment, in contrast, the fixed data buffer is assigned the lower memory addresses of a memory area.

When an emulation mode is determined in the automatic emulation determination operation, the state of the saved area in the memory which stores data received from the host computer is either in the state shown in FIG. 3A or the state shown in FIG. 3B. Therefore, if the saved memory area is in the state shown in FIG. 3B, similarly to the case of FIG. 1B in the first embodiment, the necessary fixed data buffer size is reserved from the top of the area, thereafter, a data buffer area which becomes unnecessary is reassigned as print data buffer area in front of the top (minimum) address of the print data buffer to expand it. In a case of FIG. 3A, the process waits until the address value of the read pointer becomes smaller than the address value of the write pointer, i.e., until the state changes to that in FIG. 3B, then the print data buffer size is expanded.

FIGS. 3A to 3C show how assignment of areas of the memory is changed, and they differ from FIGS. 1A to 1C in that the point where the positions of the print data buffers and the fixed data buffers are switched.

Further, FIG. 4 is a flowchart showing processing for expanding the print data buffer, and step S7' in FIG. 4 and step S7 in FIG. 2 are different. More specifically, at step S7' in FIG. 4, it is not the low end address of the print data buffer that is changed but the high end address of the print data buffer to expand it. As a result, the print data buffer is expanded as shown in FIG. 3C.

Accordingly, it is possible to achieve the same effects as those in the first embodiment.

The present invention can be applied to not only a printer but also any apparatuses, such as a copying machine and a facsimile, which require a fixed data buffer and a print data buffer.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

According to the buffer managing method and a printing apparatus adapting the method according to the present invention as described above, when switching between a plurality of different emulation modes automatically, it is possible to set the fixed data buffer size necessary for each emulation mode, thereby a memory area can be effectively used without waste. Further, since the remaining memory area is assigned as a print data buffer area, it is possible to increase the print data buffer size without increasing the capacity of the memory.

The present invention is not limited to the above embodiments and various changes and modifications can be made within the spirit and scope of the present invention. Therefore to appraise the public of the scope of the present invention, the following claims are made.

What is claimed is:

1. A printing apparatus for performing printing based on print data received from a host computer, said apparatus comprising:

storage means for storing data;

first reservation means for reserving a first storage area in said storage means;

second reservation means for reserving a second storage area as a ring buffer formed by connecting both ends of the second storage area, adjacent to the first storage area in said storage means, for storing the print data;

determination means for determining a size of an area which can be removed from the first storage area; and allocation changing means for changing allocation of the first storage area and the second storage area so that the determined size of the first storage area is added to the second storage area, if the print data which is not read out is not stored at an end address of the second storage area.

2. The printing apparatus according to claim 1, wherein, if it is determined that the print data is stored at the end address of the second storage area, then said allocation changing means waits until the storage means reaches a state in which no print data is stored at the end address of the second storage area.

3. The printing apparatus according to claim 1, wherein said allocation changing means determines whether or not the print data is stored at the end address of the second storage area by comparing a write pointer which indicates a writing position in the second storage area and a read pointer which indicates a reading position in the second storage area.

4. The printing apparatus according to claim 1, wherein said allocation changing means does not change allocation of the first storage area and the second storage area, if the print data which is not read out is stored at an end address of the second storage area.

5. The printing apparatus according to claim 1, wherein, when a size of an area required by an emulation mode is smaller than a size initially set, said allocation changing means changes allocation of the first storage area and the second storage area.

6. The printing apparatus according to claim 1, further comprising:

emulation determination means for determining an emulation mode in accordance with the print data received from the host computer, wherein said determination means calculates a difference between a size of an area required by the determined emulation mode and a size of the first storage area.

7. The printing apparatus according to claim 1, wherein the printing apparatus is at least one of a laser beam printer and an ink jet printer.

8. A printing method for performing printing based on print data received from a host computer, said method comprising the steps of:

reserving a first storage area in a storage device;

reserving a second storage area as a ring buffer formed by connecting both ends of the second storage area, adjacent to the first storage area in the storage device, for storing the print data;

determining a size of an area which can be removed from the first storage area; and changing allocation of the first storage area and the second storage area so that the determined size of the first storage area is added to the second storage area, if the print data which is not read out is not stored at an end address of the second storage area.

9. The printing method according to claim 8, wherein, if it is determined that the print data is stored at the end address of the second storage area, then said changing step waits until the storage device reaches a state in which no print data is stored at the end address of the second storage area.

10. The printing method according to claim 8, wherein it is determined whether or not the print data is stored at the end address of the second storage area by comparing a write pointer, which indicates a writing position in the second storage area, with a read pointer which indicates a reading position in the second storage area.

11. A computer program product loadable into the memory of a computer, comprising software code portions for performing the method according to claim 8 when said computer program product is run on a computer.

12. The printing method according to claim 8, wherein said allocation changing step does not change allocation of the first storage area and the second storage area, if the print data which is not read out is stored at the end address of the second storage area.

13. A storage medium storing processor executable instructions for controlling a processor to carry out the steps of:

reserving a first storage area in a storage device;

reserving a second storage area as a ring buffer formed by connecting both ends of the second storage area, adjacent to the first storage area in the storage device, for storing print data;

determining a size of an area which can be removed from the first storage area; and changing allocation of the first storage area and the second storage area so that the determined size of the first storage area is added to the second storage area, if the print data which is not read out is not stored at an end address of the second storage area.

14. The storage medium according to claim 13, wherein, if it is determined that the print data is stored at the end address of the second storage area, then said changing step waits until the storage device reaches a state in which no print data is stored at the end address of the second storage area.

15. The storage medium according to claim 13, wherein it is determined whether or not the print data is stored at the end address of the second storage area by comparing a write pointer, which indicates a writing position in the second storage area, with a read pointer which indicates a reading position in the second storage area.

16. The printing storage medium according to claim 13, wherein said allocation changing step does not change allocation of the first storage area and the second storage area, if the print data which is not read out is stored at the end address of the second storage area.

17. A printing apparatus for performing printing based on print data received from a host computer, said apparatus comprising:

storage means for storing data;

first reservation means for reserving a first storage area in said storage means;

second reservation means for reserving a second storage area as a ring buffer formed by connecting both ends of the second storage area, adjacent to the first storage area in said storage means, for storing the print data;

determination means for determining a size of an area which can be removed from the first storage area; and allocation changing means for changing allocation of the first storage area and the second storage area so that the determined size of the first storage area is added to the second storage area, wherein said allocation changing means does not change allocation of the first storage area and the second storage area if the print data which is not read out is stored at an end address of the second storage area.

18. The printing apparatus according to claim 17, wherein, if it is determined that the print data is stored at the end address of the second storage area, then said allocation changing means waits until said storage means reaches a state in which no print data is stored at the end address of the second storage area.

19. The printing apparatus according to claim 17, wherein said allocation changing means determines whether or not the print data is stored at the end address of the second storage area by comparing a write pointer which indicates a writing position in the second storage area and a read pointer which indicates a reading position in the second storage area.

20. The printing apparatus according to claim 17, wherein, when a size of an area required by an emulation mode is smaller than a size initially set, said allocation changing means changes allocation of the first storage area and the second storage area.

21. The printing apparatus according to claim 17, further comprising:

emulation determination means for determining an emulation mode in accordance with the print data received from the host computer, wherein said determination means calculates a difference between a size of an area required by the determined emulation mode and a size of the first storage area.

22. The printing apparatus according to claim 17, wherein the printing apparatus is at least one of a laser beam printer and an ink jet printer.

* * * * *

UNITED STATES PATENT AND TRADEMARK OFFICE
CERTIFICATE OF CORRECTION

PATENT NO. : 6,441,917 B1
DATED : August 27, 2002
INVENTOR(S) : Ikeda

It is certified that error appears in the above-identified patent and that said Letters Patent is hereby corrected as shown below:

Title page,
Item [57], ABSTRACT,
Line 8, "down loaded" should read -- downloaded --.

Column 2,
Line 27, "or not no" should read -- no --.

Column 5,
Line 62, "during in" should read -- during --.

Column 7,
Line 28, "ossible" should read -- possible --;
Line 29, "een" should read -- been --; and
Line 30, "asted" should read -- wasted --.

Column 10,
Line 5, "claim 8" should read -- claim 8, --.

Signed and Sealed this

First Day of April, 2003

JAMES E. ROGAN
*Director of the United States Patent and Trademark Office*